Sept. 8, 1964   R. W. SCHUMANN   3,148,353
TIMING CIRCUIT
Filed Aug. 29, 1961   2 Sheets-Sheet 2

INVENTOR.
Robert W. Schumann
BY
Byron, Hume, Groen & Clement
Attys.

United States Patent Office 3,148,353
Patented Sept. 8, 1964

3,148,353
TIMING CIRCUIT
Robert W. Schumann, Madison, Wis., assignor to Nuclear Data, Inc., Madison, Wis., a corporation of Illinois
Filed Aug. 29, 1961, Ser. No. 134,689
7 Claims. (Cl. 340—172.5)

The present invention relates to pulse height analyzers such as used with radiation detectors and particularly to a system for accurately recording the time amplitude distribution of pulses received by the analyzer.

Radioactive materials emit photons or particles of radiation, the energies of which vary in magnitude. For any particular radioactive element, the energies of the photons or particles emitted are particular and generally distinguishable from those of every other radioactive element. Thus each radioactive element is said to have an identifying emission amplitude sepectrograph and to be identifiable thereby. Accordingly, it is possible to identify the particular radioactive element or elements in any sample of radioactive materials by detecting and analyzing the emitted radiation. Radiation detectors perform the function of detecting the emitted radiation and pulse height analyzers perform the function of determining the amplitude distribution of the emitted radiation.

Pulse analyzers in common use with nuclear radiation detectors receive the variety of amplitudes of information pulses provided by the detector, sort the information pulses according to amplitude, and register the count of the number of information pulses of each given amplitude that occur during an analysis period. In the analyzer a finite time is required to analyze each information pulse received, determine its amplitude, designate from that analysis an appropriate amplitude channel in the storage memory for receiving the count, and thereafter register a count in the designated channel of the storage memory. During the finite time interval that it takes to sort each pulse and register a count therefor, the analyzer remains non-responsive to any other pulses that may be applied. This non-responsive period is referred to as the dead time of the analyzer. That interval during which the analyzer is available to receive pulses and does receive pulses is referred to as the live time of the analyzer. Accordingly, in order to determine absolutely the number of photons or particles of each energy which were detected per unit of measurement time, it is necessary accurately to determine the live time of the analyzer. While it is true that the identification of the kinds of radioactive material is accomplished independent of time considerations and is determined entirely by examination of the distribution of energies of the detected particles, the frequently important determination of the intensity, or degree of radioactivity of the material requires an accurate indication of the live time of the measurement. The total experiment time, as determined by a timepiece such as a stop watch, only approximately indicates the true measurement of time, for the dead time during analysis of each signal pulse from the radiation detector may be substantial and varies in a complex manner, generally indeterminate except by direct measurements during the analysis.

One method of determining the live time of an analyzer is to utilize a pulse generator producing timing signal of a constant frequency in conjunction with a timing pulse counter controlled to register a timing count only during the actual live time of the analyzer. While such an arrangement is usable for an analysis of only moderate accuracy, where higher accuracy is required, considerable difficulty is experienced in coordinating the pulse counter operations exactly to the useful live time of the analyzer, as will be understood from the following considerations.

To secure proper operation of the analyzer it is conventional to provide the analyzer with an input gate circuit which recognizes the presence of an electrical information pulse at the input to the gate circuit and admits the information pulse for pulse-height analysis. After the incoming information pulse has been admitted for analysis the input gate circuit is closed for a period of time corresponding to the time required for the analysis. Those information pulses which occur during the intervals when the input gate circuit is closed are not recorded by the analyzer.

However, it does often happen that an information pulse is presented to the input gate circuit just as it is being switched from the closed to the open condition. In such cases it is quite possible that the information pulse will be distorted and the output signal applied to the analysis circuit will not represent the amplitude information contained in the original incoming information pulse. Such signals should not be analyzed or, at least, a count corresponding to such signals should not be recorded in the count register of the analyzer. In the circumstance where a highly accurate analysis is desired, it becomes important to eliminate from the count register each count that corresponds to any such distorted information pulses.

Elimination in the analyzer of each count corresponding to a distorted information pulse is but a partial solution to the problem of accurate analysis because unless there is eliminated from the time recording channel time counts corresponding to the interval of the distorted information pulses, there will remain an inaccuracy between the recorded live time and the effective live time of the analyzer. Thus it becomes the broad object of this invention to provide an analyzer arrangement that can overcome these deficiencies in accuracy.

It is a general object of the invention to provide a new and improved input and timing control for an analyzer system wherein the indicated live time of the analyzer corresponds except for statistical variations accurately to the intervals during which the analyzer was available to accept those undistorted information pulses provided to it.

It is another object of the present invention to provide a new and improved input and timing control system for an analyzer whereby the dead time of the analyzer corresponds not only to the actual time needed to analyze and tally a count for each information pulse received but wherein the amplitude count corresponding to any distorted input pulses and the time count corresponding to an equivalent elapsed time thereof are rejected, respectively, from the amplitude analysis count and from the time storage count.

A more specific object of the invention is to provide an improved input and timing storage control whereby the time recording channel of the analyzer is controlled precisely and only in accordance with the operation of the amplitude count storage portion of the analyzer.

A more specific object of the invention is to provide a new and improved analyzer system wherein the information pulse input channel and the timing pulse input channel are coincident so that both the information pulses and the timing pulses operate on the analyzer and are operated on by the analyzer system in exactly the same fashion and manner.

It is another object of the invention to provide an improved analyzer system wherein the time that the analyzer is operational and may receive input pulses is accurately determined by mixing timing pulses with the information pulses and applying the mixed pulses to the input of the analyzer for amplitude analysis and separate amplitude and time count recording.

It is another object of this invention to provide an improved analyzer system wherein periodic timing pulses are presented to the analyzer through the same input circuit as are information pulses and wherein any pulse presented to the input circuit of the analyzer during the time that the input circuit is opening will be rejected and not recorded in the count storage portion of the analyzer.

A more specific object of the invention is to provide an improved analyzer system wherein information pulses of variable amplitudes and timing pulses of an amplitude distinct from the information pulse amplitudes are fed into the analyzer through the same input, subjected to amplitude analysis and employed on the basis of amplitude to select an appropriate amplitude channel in the storage memory for receiving a storage count. Included in the improved system is an arrangement whereby any pulse, either an information pulse or a timing pulse that may suffer amplitude distortion cancels the storage of any count that might have been directed to the storage members.

Other objects and features of the invention will become more apparent if the following is viewed in light of the drawings, in which.

Figure 1:
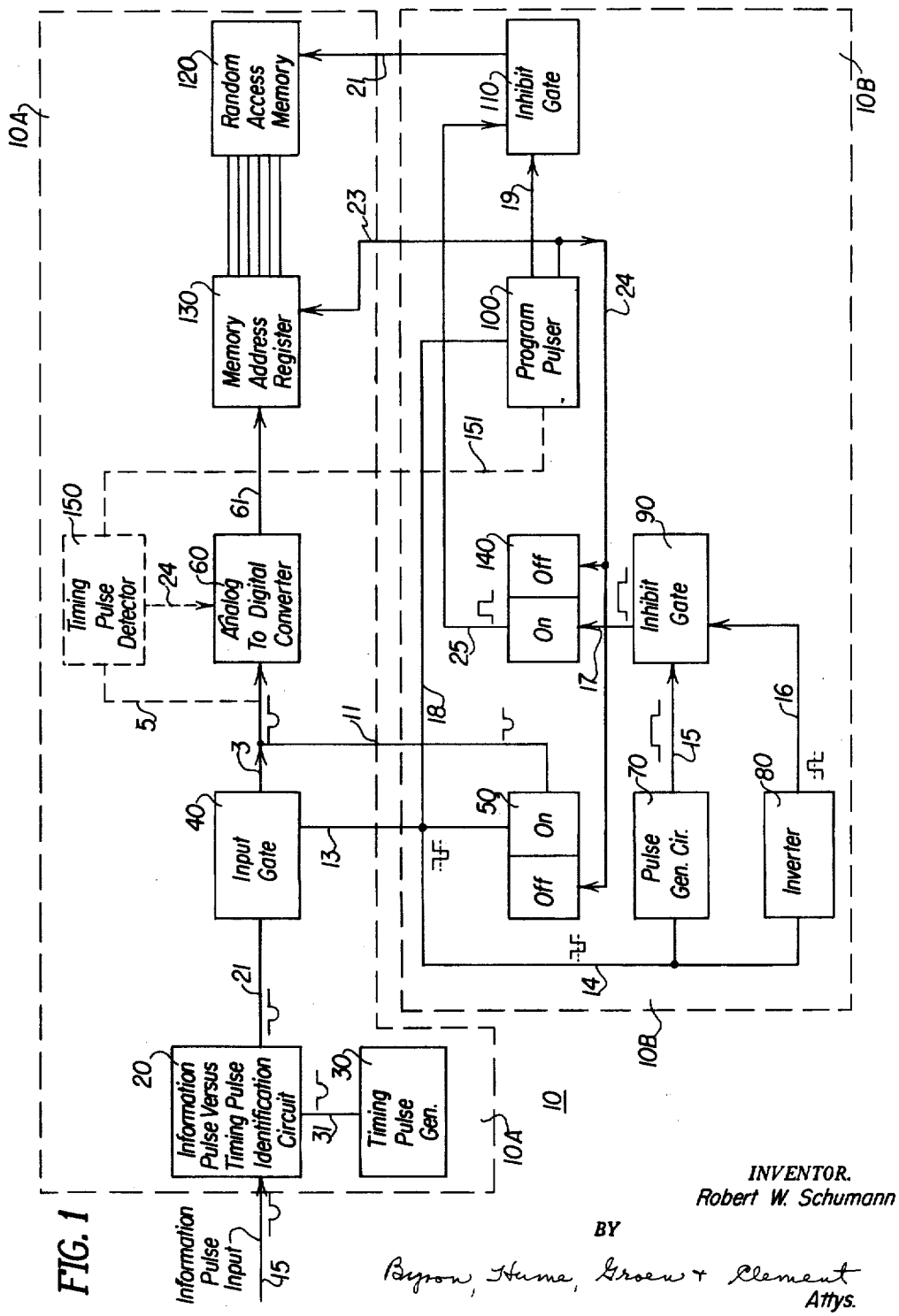
FIGURE 1 is a block diagram representation of the circuitry embodying the features of one embodiment of the invention.

Before giving detailed consideration to the arrangement shown in the drawings, it is well to review the statistical considerations that are the basis for the present arrangement. It is desired that the total count of timing pulses recorded in the analyzer should provide an accurate representation of the total live time of the analyzer. This count is not in itself a measure of that live time, but is an indication from which a substantially accurate determination of live time can be made. It depends upon the realization that where timing pulses are furnished at the clock frequency of P pulses per second, and where a count of $nP$ pulses are recorded, then the live time of the analyzer is $n$ seconds. However, in the present arrangement, this determination is statistically valid only where the quantity $nP$ is large. By way of further explanation, in the circumstance where both timing pulses and information pulses are applied to the analyzer through the same input gate, as in the present circumstance, should the information pulses occur with a great frequency, the analyzer may be rendered busy and the input gate closed for a substantial portion of the total experiment time. In a specific case, for example, the input gate may be closed for as much as 90% of the total experiment time, in which case 90% of all the pulses including information pulses and timing pulses would be blocked from the analyzer. Therefore, timing pulses applied to the input gate at the rate of 100 per second, for example, would be recorded in the analyzer at the rate of approximately 10 per second. Of course this is a random situation, for in the first second of the total experiment time perhaps only five timing pulses may be recorded and in the next second as many as twelve timing pulses may be recorded, but over a very long period, the timing pulses will be recorded at the rate of 10 per second. Thus, it is apparent that in a short measurement, for example, one second, there can be no accurate recording of the live time.

However, in a long measurement where, for example, a million timing pulses are recorded, the statistical possibility of the recording as being an accurate indication of the actual live time of the analyzer becomes excellent. In this circumstance, the typical error in statistical accuracy would be $\pm 1\%$. If the one million timing pulses were recorded during the total experiment time when eleven million timing pulses were made available to the input of the analyzer, this same ratio may be employed as an indication of the probability of acceptance of pulses so that within an accuracy of $\pm 1\%$ it can be said that one out of eleven information pulses would also be accepted.

Were it true that the probability for acceptance of the timing pulses and information pulses is the same, it would also be true that the probability for rejection of timing pulses and information pulses is the same. Thus where means are provided fro rejecting all pulses that may occur during those intervals when the input gate is being switched from its closed position to its open position, the probability is that the same percentage of timing pulses and information pulses will be rejected. Accordingly, the total number of counted timing pulses will provide a correct representation of the total live time of the analyzer within the limits established by statistical variation. The method and means of the correct representation of the total live time of the analyzer is considered hereinafter.

In accordance with the method of the present invention, cyclically repeated uniform amplitude timing pulses are introduced into the amplitude spectrum of information pulses and both are applied to the analyzer through the same input circuit. In the analyzer the timing pulses are identified and a count is recorded for each identified timing pulse. Similarly, the information pulses are identified and analyzed according to amplitude and a count is recorded for each information pulse according to its amplitude. The analyzer is controlled so that if a timing pulse or information pulse is passed through the input circuit, the input circuit is blocked for an interval necessary to complete the analysis and recording of a count. Thereafter, the input circuit is again open to receive any pulses that might be fed therethrough.

Further, the analyzer is controlled so that if a pulse appears in the input circuit during the interval that it is being operated from its blocked condition to its unblocked condition, any count caused by that pulse is negated. Thus timing pulses and information pulses are recorded only if they occur when the analyzer is in a condition to properly accept signal pulses, and both the timing pulses and the information pulses will have the same probability of acceptance or rejection. As explained above, except for statistical variations, the timing pulse counts so recorded provides an accurate measurement of the live time of the analyzer. The means by which the method of the present invention is accomplished will be understood by reference to the following disclosure and drawings forming a part thereof.

In FIGURE 1 there is illustrated in block schematic form the system in accordance with the invention. Therein, the analyzer 10 is identified as being comprised of a signal pulse receiver and recorder portion 10A and a controller portion 10B. The receiver and recorder portion 10A receives the incoming signal pulses, analyzes the pulses according to kind and amplitude, and in accordance with this analysis, selects an appropriate channel for receiving a pulse count. The controller portion 10B is made up of circuitry for controlling the admission of signal pulses to the receiver and recorder portion and for actually causing the recording of pulse counts in the selected channels of the receiver and recorder portion.

The signal pulse receiver and recorder portion 10A includes an input conductor 15 extending from a source of information pulses, a timing pulse generator 30, an information pulse-timing pulse identification circuit 20, and input gate circuit 40, a timing pulse detector 150, an analog-to-digital converter 60, a memory address register or memory channel selection circuit means 130, and a random access memory 120. In this arrangement, information pulses applied to conductor 15, as from a radiation detector, for example, and timing pulses from the timing pulse generator 30 are provided to the identification circuit 20 wherein the timing pulses, if not already so identified, are rendered distinguishable from the information pulses. The composite of the information pulses and timing pulses are then applied from the identification circuit 20 to the input gate 40 which is selectably controlled from the controller, as explained hereinafter, into an open position and closed position. Pulses transmitted through the input gate 40 are then applied jointly to the timing pulse detector 150, the analog-to-digital convertor 60 and to a conductor 11 extending to the controller portion 10B.

In the analog-to-digital convertor 60, the pulses so received are analyzed according to the amplitude and a digital signal corresponding thereto is transmitted to the memory address register 130. The timing pulse detector 150 responds to each of the timing pulses transmitted by the input gate 40 and thereupon operates the analog-to-digital converter 60 to block its amplitude analysis operation and to transmit a distinct digital signal to the memory address register 130.

The memory address register 130 is associated with the random access memory 120. The memory 120 includes a plurality of channels each operative for recording a number of counts therein. Each of the channels is identified by an address and is selectable from the memory address 130 in accordance with the digital information provided thereto from the converter 60. Accordingly, the digital information received in the memory address register 130 operates to select a corresponding channel in the memory 120 and to activate that channel to register a count when pulsed from the controller 10B. Subsequent to pulsing of the memory 120 from the controller 10B, the memory address register 130 is cleared by a signal from the controller 10B and arranged to receive a new incoming address.

The controller portion 10B, includes an on-off circuit 50, a pulse generator circuit 70, an inverter circuit 80, a coincident gate circuit 90, an on-off circuit 140, a program pulser 100 and an inhibit gate circuit 110. The on-off circuit 50 is operative by means of the conductor 11 from the receiver and recorder portion 10A for purposes of controlling the input gate 40 via the conductor 13 and also for supplying an input signal to the pulse generator 70 and the inverter circuit 80 via the conductor 14. Further, and coincident with the signals provided by the conductors 13 and 14, the on-off circuit 50 provides an initiating signal to the program pulser 100 via the conductor 18.

The pulse generator circuit 70 is triggered in response to each signal received thereby over the conductor 14 for supplying a signal of a predetermined minimum duration to the coincident gate 90 via the conductor 15. The inverter circuit 80 merely inverts the signal applied to the conductor 14 and applies that inverted signal via the conductor 16 to the coincident gate 90. The coincident gate 90 is operative so that if the signal provided on the conductor 15 is of a longer duration than that signal provided on the conductor 16, the gate operates to provide at the conductor 17 a signal for switching the on-off circuit 140 into its "on" condition. Operation of the on-off switch 140 into its "on" position applies a signal to the conductor 25 which is extended to the inhibit gate 110 for preventing operation of the gate circuit 110.

Figure 4:
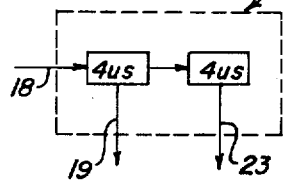
FIGURE 4 is a detailed schematic of the program pulser shown in FIGURE 1.

The gate circuit 110 is associated with the program pulser 100, the latter of which is operated through a cycle in accordance with an input provided thereto via the conductor 18. The pulser 100 operates so as to provide appropriate control signals in a sequential fashion to the inhibit gate and thereafter to the conductors 23 and 24. Typical delays for the control signals applied by the program pulser are illustrated in FIGURE 4. The signal applied to the inhibit gate, for example four microseconds after receipt of a signal on line 18, is effective for operating the gate to apply a signal via the conductor 21 to the random access memory in the receiver and recorder portion 10A. It is this signal applied via the conductor 21 which is recorded as a count in the random access memory. Accordingly, the signal applied from the gropram pulser via the conductor 19 is timed to occur after the analog-to-digital converter is operated and after the memory address register 130 has selected a storage channel in the random access memory 120. Thereafter, for example, again after a four microseconds delay, the program pulser operates to apply a signal to the conductor 23 extending to the memory address register 130 in the receiver and recorder portion 10A for clearing that register and also for applying the signal via the conductor 24 to the on-off circuit 50. At this time then, the on-off circuit 50 is operated into its off condition thereby to send the signal via the conductor 13 for operating the input gate 40 in the receiver-recorder portion 10A into its open condition.

As pointed out previously, it is preferred that the random access memory be rendered inoperative if either an information pulse or a timing pulse is presented to the input gate when the input gate is being switched from its closed position to an open position. This is necessary because during that interval there is a likelihood of a distortion in the pulse transmitted therethrough and a consequent likelihood of error in the analysis of the pulse. To facilitate this consideration, the pulse generator 70, the inverter circuit 80, the coincident gate 90, the on-off circuit 140 and the inhibit gate 110 operate responsive to the admission of an input pulse through the input gate to determine whether the emitted pulse occurred just before, during or just after the input gate was switched from its closed to open position. If the admitted pulse is adjudged to have been admitted under conditions that would make it susceptible to distortion, the network prevents a pulse count from being sent to the random access memory.

It is to be specifically noted that according to this plan exactly the same circuits which adjudge the signal pulses as desirable or undesirable, are used also to adjudge the timing pulses as desirable or undesirable. Thus the criteria for acceptance and rejection is identical for both signal pulses and timing pulses. Accordingly, the same proportion of both classes of pulses are rejected and the overall live time determination then is dependent only upon the frequency of the timing pulses and the statistical variation in the recording.

Figure 3:
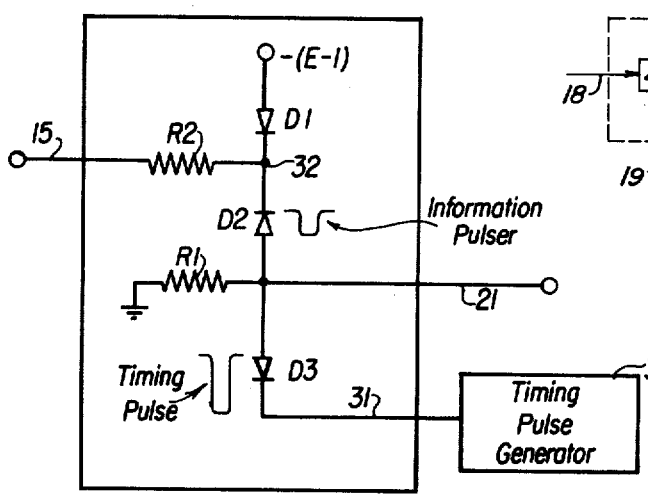
FIGURE 3 is a more detailed schematic illustration of the information pulse versus timing pulse identification circuit represented in FIGURE 1.

Giving more specific consideration to the construction and operation of the circuitry utilized in the present invention, there is shown in FIGURE 3 a schematic representation of an information-timing pulse identification circuit 20 suitable for use in the arrangement of FIGURE 1. The information circuit 20 as illustrated in FIGURE 3 includes an input conductor 15 supplied with variable amplitude information pulses, an input conductor 31 supplied with timing pulses and an output conductor 21. In the normal circumstance where there is no input signal to the conductors 15 or 31 the identification circuit 20 is inoperative and no signal appears on the conductor 21. The generator 30 supplies negative-going timing pulses of an amplitude of E volts which are applied to the conductor 31 and render the diode D3 conductive in a path from ground potential through a resistor R1. The output conductor 21 is connected to the junction between the resistor R1 and diode D3 so that each time that the diode D3 is rendered conductive there appears on the conductor 21 a corresponding negative-going pulse of a potential of approximately −E volts. In a similar manner negative-going pulses applied to the conductor 15, as from a radiation detector, bias the diode D2 conductive in a path from ground potential and through resistor R1, diode D2 and resistor R2. Accordingly, there appears at the conductor 21, corresponding negative-going pulses of an amplitude determined by the amplitude of the signal supplied to the conductor 15. Under normal circumstances, the amplitude of the pulses on the conductor 15 is less than that supplied from the generator 30, so that the information pulses and timing pulses as they appear on the conductor 21 are distinguishable on an amplitude basis. However, it may happen, and does happen as from noise or other causes, that the pulses supplied to the conductor 15 may be of an amplitude as large as or greater than the pulses supplied to the input conductor 31. It can be seen that without some additional provision of circuitry, a problem might develop in distinguishing the information pulses derived from the conductor 15 and the timing pulses derived from the input conductor 31. To avoid this difficulty, the information timing pulse identification circuit 20 includes therein a diode D1 which is connected at one of its terminals to the junction between the resistor R2 and the diode D2 and is connected at its other terminal to a source of negative potential of a value of $-(E-1)$. With such a connection, the junction 32 between resistor R2 and diode D2 can never go more negative than $-(E-1)$ volts. Accordingly, the only signals that can be of a potential of $-E$ volts on conductor 21 are those pulses derived from the generator 30. In this manner, the timing pulses on the conductor 21 are always recognizable by virtue of the fact that they are of a magnitude of $-E$ volts and the information pulses on the conductor 21 are identifiable by reason of the fact that they are of an amplitude of less than $-E$ volts. These pulses are supplied via the conductor 21 to the input gate 40.

The input gate 40 illustrated in FIGURE 1 may be of any suitable type inhibiting circuit, which is normally conductive but is rendered non-conductive by the application of a control signal thereto. Specifically, the input gate 40 is designed to be of a substantially linear type so as to provide at the output conductor 3 thereof a signal corresponding in amplitude to the input signal supplied at the conductor 21. Its inhibiting function is controlled by operation of the on-off circuit 50 via the conductor 13.

Figure 2:
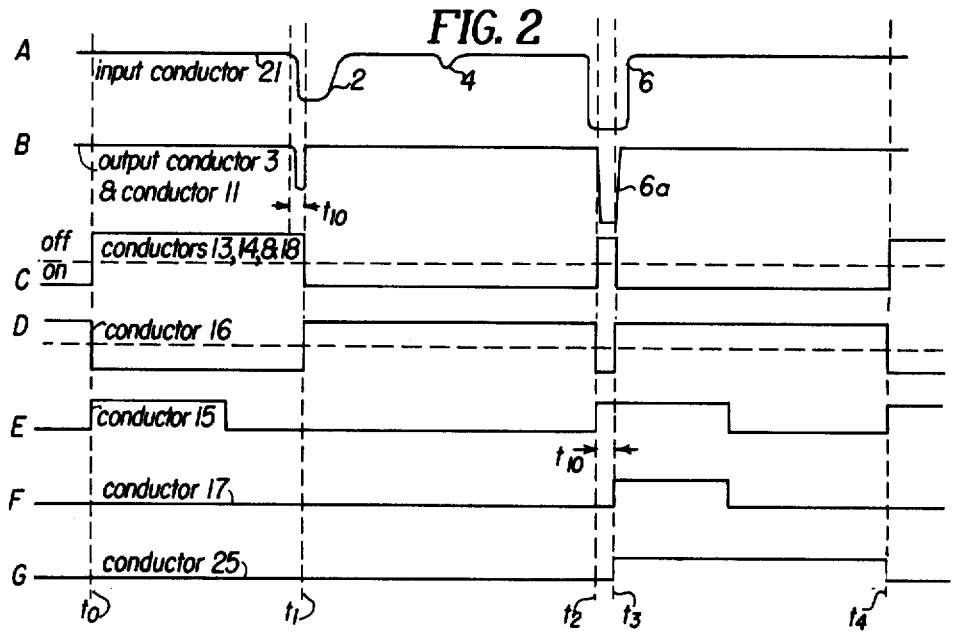
FIGURE 2 is a pulse time sequence representation of pulses appearing at various parts of the circuitry illustrated in FIGURE 1.

FIGURE 2 provides a graphic representation of pulses appearing at different points in the circuit of FIGURE 1 under control of the system. The pulses illustrated at plot A of FIGURE 2 represent those information and timing pulses appearing on conductor 21 and supplied to the input gate 40. Those pulses shown at plot B of FIGURE 2 illustrate those information and timing pulses admitted through the input gate 40 and appearing at the output conductor 3 thereof in the particular circumstance of the present example. It should be appreciated that the timing pulses are regularly occurring and periodic in their appearance, whereas the information pulses are random in time of occurrence and in amplitude, although it is appreciated that the amplitude distribution of information pulses over a statistically accurate time period are not random but provide a discrete and identifiable pattern. In the arrangements of FIGURE 2 the pulses 2 and 4 are information pulses and the pulse 6 is a timing pulse. The pulses 2 and 4, as previously explained, can have a magnitude of not greater than $-(E-1)$ volts, whereas the pulse 6 is of an amplitude of $-E$ volts.

Initially, at the time $t_0$, the input gate 40 is open and any pulses appearing on the conductor 21 are transmitted through the gate 40 substantially undistorted. Upon transmission through the input gate 40 and application to the conductor 3, the pulses are applied to the analog-digital converter 60, wherein the amplitude of the pulse is measured and a corresponding digital number is generated. This operation may be performed on each pulse appearing on the conductor 3, whether information or time pulse, although, as described further hereinafter, an alternative procedure may be practiced with regards to timing pulses appearing on the conductor 3.

Each pulse appearing on the conductor 3 is also transmitted by the conductor 11 to the off-on circuit 50 which may be, for example, of the multivibrator type. In its initial or "off" condition, the off-on circuit 50 applies to the conductor 13 and also to the conductors 14 and 18 associated therewith a positive-going signal as illustrated at plot C of FIGURE 2. Upon application of a signal to the conductor 11 the off-on circuit 50 is flipped from its "off" condition to its "on" condition, at time $t_1$ thereby applying to the conductor 13 and its associate conductors, a negative-going or inhibit voltage. At the input gate 40 the negative voltage on the conductor 13 operates to render the input gate closed for an interval determined by the duration of the signal on the conductor 13.

The response of the off-on circuit 50 when it is triggered, for example from its "off" condition to its "on" condition, is adjusted to provide sufficient delay for an interval represented by $t_{10}$ in plot B so that at least the peak amplitude of the longest expected incoming pulse is passed through the input gate 40 before the circuit 50 operates to close the input gate 40. As soon as the off-on circuit 50 is flipper to its "on" position, any further incoming pulses applied to the input conductor 21 are prohibited from passing through the input gate 40, at least until the input gate is reopened at time $t_2$ by subsequent operation of the off-on circuit 50 from its "on" condition to its "off" condition.

Thus, referring to FIGURE 2, the information pulse 2 therein appearing on the input conductor 21 to the input gate 40 is admitted to the conductor 3 and operates the off-on circuit 50 to apply an inhibit signal to the conductor 13 and close the input gate 40 as illustrated in plot C. The manner in which the inhibit signal on the conductor 13 is utilized via the conductors 14 and 18 is described further hereinafter.

As pointed out, the signal appearing on the conductor 3 is digitalized in the converter 60 or, in other terms, is analyzed according to amplitude and has a corresponding digit assigned thereto. Thereupon, a train of pulses representing the digit is transmitted via the conductor 61 to the memory address register 130. In the memory address register 130 the train of pulses selects a corresponding channel or storage area in the random access memory to activate the channel or storage area to receive a pulse count. Subsequently, the random access memory 120 is operated to register a count in the selected channel. However, at this stage in our explanation only the appropriate channel has been selected and no count has been registered. The registering of the count is controlled from the program pulser 100.

When the off-on circuit 50 is switched from its "off" position to its "on" position, the negative pulse on the conductor 13 is also extended via the conductor 18 to the program pulser 100. Therein the negative-going pulse on the conductor 18 operates the program pulser 100 to provide on the conductor 19, after a period corresponding to the analysis period of the analog-digital converter 60, a potential which is applied via the normally open inhibit gate circuit 110 to the conductor 21 extending to the random access memory 120. Thereupon, a count is caused to be stored in the random access memory 120.

The program pulser performs other control functions such as resetting the off-on circuits 50 and 140 and clearing the memory address register 130. Specifically, the program pulser 100 may contain a timing equipment for providing a pulse to conductors 23 and 24 at the time $t_2$ after analysis and recording, if any, of count has been completed. The pulse appearing on the conductor 24 acts to restore the off-on circuit 50 from its "on" position to its "off" position and to restore the off-on circuit 140 if operated, from its "on" position to its "off" position. Similarly, the pulse appearing on the conductor 23 acts to clear the memory address register and prepare it to receive a new address from the converter 60.

The time delay inserted by the program pulser 100 should be of a duration at least as long as that required to process a pulse through the converter 60, the memory address register 130 and the random access memory 120 and to cause the registration of a count therein.

At the time $t_2$ then, the off-on circuit 50 may be switched from its "on" position to its "off" position, thereby applying anew to the conductor 13 and the associated conductors 14 and 18 a positive-going potential. At the pulse-generator circuit 70, the occurrence of positive-going potential applied to conductor 14 will trigger the pulse generator 70 to generate a positive-going signal of a predetermined amplitude and duration. The pulse generator 70 may be of a monostable multivibrator, for example, and the output thereof is applied to the conductor 15 as illustrated at plot E of FIGURE 2. The positive-going pulse so generated is applied to the coincidence gate circuit 90. At the same time, the positive potential on the conductor 14 is applied to the inverter circuit 80 wherein the positive-going signal is converted into a negative-going signal and appears on the conductor 16 as illustrated at plot D of FIGURE 2. The signal on the conductor 16 is also applied to the coincidence gate circuit 90. The duration of the pulse provided from the pulse generator 70 at conductor 15 corresponds to the duration of the longest expected information pulse on the conductor 21 applied to the input gate 40. The negative-going signal on conductor 16 persists for the interval that the off-on circuit 50 is in its "off" condition, or as long as the input gate is in its "open" condition.

The coincidence gate 90 is constructed so that the coincident appearance of a positive-going pulse on the conductor 15 and a negative-going pulse on the conductor 16 prevents the generation of a signal on conductor 17, but the appearance of a positive-going signal on the conductor 15 and the appearance of a positive-going signal on conductor 16 generates a signal on conductor 17 as illustrated at plot F of FIGURE 2.

Thus, at the interval $t_2$ when the off-on circuit 50 is switched from its on condition to its off condition, the pulse generator 70 will be operated via the conductor 14 to apply a positive-going pulse of a predetermined minimum duration to the conductor 15. If at that same instant, there is a pulse 6 already applied to conductor 21 extending to the input gate 40, a portion of that pulse 6A as shown in plot B of FIGURE 2, will be admitted through the input gate 40 to the conductor 3 and causes the off-on circuit 50 to be operated from its "off" condition to its "on" condition at the time $t_3$. Accordingly, a negative potential is applied to the conductor 14 which is inverted via the inverter 80 to a positive potential applied on the conductor 16. In this circumstance, the coincident gate 90 is operated by virtue of the positive potentials on both of the conductors 15 and 16 so that a signal is applied to conductor 17 as shown in plot F and extended to the off-on circuit 140. Thereupon, circuit 140 is to be operated so as to apply a positive going signal to the conductor 25 extending to the inhibit gate 110, as shown in plot G of FIGURE 2. The appearance of the positive potential on the conductor 25 at the inhibit gate 110 will block the inhibit gate 110 so as to prevent the sending of any pulse therethrough via the conductor 21 to the random access memory 120. Accordingly, storage of a count in this circumstance is blocked.

Thereafter, at a time $t_4$ the program pulser 100 operates to send clearing pulses via the conductors 23 and 24 to the address register 130 and the off-on circuits 50 and 140. In that instance the analyzer 10 will have been operated through its cycle without causing any registration of a count in the count device associated therewith.

From the foregoing, it will appear clear that in the circumstance where a signal is incoming to the input gate 40 just at the instant that the gate is being switched from its closed to its open position, the circuitry in the receiver and register 10A will operate in its ordinary manner to analyze the amplitude of the signal pulse, select a corresponding address therefor, operate the address register to select the channel and activate the appropriate channel in the memory in preparation to receive the count. However, in the controller 10B this pulse will cause operation which will block the registration of any count in the random access memory during the course of that analyzer cycle.

It was mentioned above that for each of the timing pulses appearing on the conductor 3 and directed to the analog-digital converter 60 there was a possibility of avoiding the complete analysis operation of the analog converter. As shown in dotted lines in FIGURE 1, the receiver and recorder 10A might also be provided with an amplitude detector 150 which is connected via the conductor 5 to the conductor 3 and is also applied via the conductor 24 to the converter 60. The detector 150 is arranged to respond only to pulses that are of an amplitude that are equal to or greater than E volts. The output conductor 24 thereof is connected directly to a selected channel address in the converter 60 so that immediately upon the appearance of the signal of the conductor 24 the selected address in the converter is operated and transmitted via the conductor 61 to the memory address register 130. Accordingly, by use of the pulse detector 150, whenever a timing pulse of an amplitude of E volts is detected, the analog-to-digital converter 60 is caused to select a particular memory address digit, such as the address digit 0, in this particular embodiment, which is connected directly via the conductor 61 to the memory address register. Accordingly, the random access memory is activated immediately to prepare channel 0 for recording of a count. At the same time, and inasmuch as the analysis period for the converter has been avoided the timing pulse detector 50 can be connected via a conductor 151 shown in dotted lines to the program pulser 100 for advancing the timing in the program pulser 100 to send a count signal to the random access memory 120 via conductor 19, inhibit gate 110 and the conductor 21. The advancement in the timing schedule of the program pulser 100 need not be so rapid as to avoid the pulse count cancelling operation in the inhibit gate 110, previously described.

From the foregoing discussion it is obvious that there has been described herein a new and improved analyzer circuit capable of providing an extremely accurate time-amplitude analysis of signals applied thereto. Specifically, one particular advantage of the analyzer in the present arrangement is that the fact that incoming pulses, both information pulses and timing pulses, are operated upon in exactly the same fashion and only those pulses that occur after the input gate is full open and in linear operation will be analyzed and registered in the random access memory. A further advantage of the arrangement is that when the analyzer input gate is closed to information pulses, it is also closed to timing pulses and with precisely the same probability of being opened to one of the random information pulses as to one of the periodic timing pulses. Therefore, it is exactly as probable that a timing pulse occurring at approximately the timing of opening of the input gate will not be counted as it is probable that a random information signal occurring at a similar time will not be counted. Accordingly, it is clear that there has been provided herewith an improved analyzer system which is truly accurate within the limits of statistical variations.

The invention herein has been described in terms of a time-amplitude distribution analyzer for purposes of easier understanding. However, it is to be appreciated that the principles described herein for accomplishing the analyzing and recording of only undistorted input signals can be applied equally well to other types of signal analyzers, and it is intended that the claims should cover such other analyzer arrangements incorporating the principles of the present invention.

The nature of the electronic equipment employed in the analyzer of the present invention will be readily understood by those having facility with the art that much of the circuitry employed herein is conventional to the computer art which may be referred to. A portion of the circuitry utilizable herein is described in an article appearing in "The Review of Scientific Instruments," volume 27, Number 9, on pages 675–685 for September, 1956. For example, an analogue to digital converter, magnetic core memory, and a memory address are all used in the analyzer shown in said article. Also, a control pulse circuit, analogues to the program pulser 100, is shown on page 676 of said article. The invention is thought to lie in the basic arrangements of the system and only incidentally in circuitry employed in the system. Accordingly, it will be understood that a variety of circuits could be employed for purposes of accomplishing the same ends of the present invention and that many modifications and variations may be made therein without departing from the true scope of the invention, and it is intended to claim in the appended claims all such variations and modifications as do fall within the true scope of the invention.

What is claimed is:

1. In a pulse height analyzer, an input circuit for receiving information pulses to be analyzed, a memory circuit having a plurality of channels, with each channel registering pulses received in a particular amplitude range, circuit means, connected to said input circuit, for determining which amplitude range a particular pulse is in, memory channel selection circuit means connected to said memory circuit and said amplitude range determining circuit means, means for measuring the "live" time of the analyzer including a pulse generator connected to said input circuit for providing fixed interval timing pulses, a channel in said memory circuit for registering said fixed interval timing pulses, circuit means for recognizing a timing pulse connected to said input circuit and to said memory address, and circuit means for blocking said amplitude range determining circuit and timing pulse recognizing circuit for a fixed interval of time after receipt of an information pulse or a timing pulse.

2. The structure of claim 1 further characterized in that said input circuit includes means for distinguishing between timing pulses and information pulses.

3. The structure of claim 2 further characterized in that the means for distinguishing between timing pulses and information pulses includes means for maintaining the information pulses at a voltage level less than the voltage level of the timing pulses.

4. The structure of claim 1 further characterized in that said blocking circuit means includes a gate circuit between said input circuit and said amplitude range determining circuit, a bistable stage, the output of said gate being connected to one input of said bistable stage and one output of said bistable stage being connected to an input of said gate.

5. The structure of claim 1 further characterized in that said blocking circuit means includes circuit means for preventing the register of any pulse received as said blocking circuit is being changed from a blocking condition to a non-blocking condition.

6. The structure of claim 1 further characterized in that said amplitude range determining circuit includes an analog to digital converter.

7. In a pulse height analyzer, an input circuit for receiving information pulses to be analyzed, a memory circuit having a plurality of channels, with each channel registering pulses received in a particular amplitude range, an analog to digital converter connected to said input circuit for determining which amplitude range a particular information pulse is in, memory channel selection circuit means connected to said memory circuit and the output of said analog to digital converter, means for measuring the "live" time of the analyzer including a pulse generator connected to said input circuit and providing fixed interval timing pulses, a channel in said memory circuit for registering said fixed interval timing pulses, said analog to digital converter including circuit means for recognizing a timing pulse, and circuit means for blocking said analog to digital converter for a predetermined fixed interval after receipt of either an information pulse or a timing pulse including a gate circuit between said input circuit and said analog to digital converter, a bistable stage, the output of said gate being connected to one input of said bistable stage, and one output of said bistable stage being connected to an input of gate.

References Cited in the file of this patent

UNITED STATES PATENTS 2,804,606    Reaves    Aug. 27, 1957

OTHER REFERENCES

"Argonne 256, Channel Pulse-Height Analyzer," Schumann et al., Review of Scientific Instruments, vol. 27, No. 9, September 1956.